US009123933B2

(12) United States Patent
Byun et al.

(10) Patent No.: US 9,123,933 B2
(45) Date of Patent: Sep. 1, 2015

(54) RECHARGEABLE BATTERY PACK

(71) Applicant: SAMSUNG SDI CO., LTD., Yongin-si, Gyeonggi-do (KR)

(72) Inventors: Bo-Hyun Byun, Yongin-si (KR); Ho-Jae Cho, Yongin-si (KR); Yeong-Mi Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 23 days.

(21) Appl. No.: 14/028,644

(22) Filed: Sep. 17, 2013

(65) Prior Publication Data

US 2014/0255732 A1    Sep. 11, 2014

(30) Foreign Application Priority Data

Mar. 6, 2013  (KR) .................. 10-2013-0023992

(51) Int. Cl.
*H01M 6/42* (2006.01)
*H01M 2/10* (2006.01)
*H01M 2/02* (2006.01)

(52) U.S. Cl.
CPC .......... *H01M 2/1016* (2013.01); *H01M 2/1061* (2013.01); *H01M 2/0245* (2013.01); *H01M 2200/00* (2013.01)

(58) Field of Classification Search
CPC .......... H01M 2200/00; H01M 2/1016; H01M 2/1061; H01M 2/0245

USPC .................. 429/138, 151, 153, 163, 167, 176
See application file for complete search history.

(56) References Cited

U.S. PATENT DOCUMENTS

| 8,118,624 | B2 | 2/2012 | Kim et al. | |
| 2005/0130030 | A1* | 6/2005 | Watanabe et al. | ............. 429/100 |
| 2006/0068281 | A1 | 3/2006 | Hiratsuka et al. | |
| 2008/0166628 | A1 | 7/2008 | Kim et al. | |
| 2011/0256446 | A1 | 10/2011 | Bronczyk et al. | |

FOREIGN PATENT DOCUMENTS

| EP | 1 498 964 A1 | 1/2005 |
| KR | 10-2008-0065822 A | 7/2008 |
| KR | 10-2011-0069367 A | 6/2011 |
| WO | WO 01/37353 A1 | 5/2011 |

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A rechargeable battery pack includes a rechargeable battery, a mount frame wrapping at least part of the rechargeable battery, an outer case wrapped around the mount frame, the outer case including a first case including a first protrusion portion protruding therefrom, and a second case having a second protrusion portion protruding therefrom, the first protrusion portion being fixed to the second protrusion portion, and a protective circuit module electrically connected to the rechargeable battery.

8 Claims, 8 Drawing Sheets

RECHARGEABLE BATTERY PACK

CROSS-REFERENCE TO RELATED APPLICATION

Korean Patent Application No. 10-2013-0023992, filed on Mar. 6, 2013, in the Korean Intellectual Property Office, and entitled: "Rechargeable Battery Pack," is incorporated by reference herein in its entirety.

BACKGROUND

1. Field

Embodiments relate to a rechargeable battery pack.

2. Description of the Related Art

A rechargeable battery can be recharged and discharged repeatedly, unlike a primary battery. A small-capacity rechargeable battery is used for small portable electronic devices such as mobile phones, notebook computers, camcorders, and the like, while a large-capacity rechargeable battery is used as a motor-driving power source for a hybrid vehicle or the like.

Typical rechargeable batteries include a nickel-cadmium (Ni—Cd) battery, a nickel-hydrogen (Ni—NH) battery, a lithium (Li) battery, a lithium ion (Li-ion) rechargeable battery, and the like. An operating voltage of the lithium ion rechargeable battery is approximately three times higher than that of the nickel-cadmium battery or the nickel-hydrogen commonly used in portable electronic equipments. In addition, the lithium ion rechargeable battery is widely used due to advantages in terms of higher energy density per unit weight.

The rechargeable battery may use a lithium-based oxide as a positive active material, and a carbon material as a negative active material. In general, the lithium-based rechargeable batteries may be classified into a liquid electrolyte battery and a polymer electrolyte battery depending on the kinds of electrolyte. A battery using the liquid electrolyte is referred to as a lithium ion battery and a battery using the polymer electrolyte is referred to as a lithium polymer battery.

The above information disclosed in this Background section is only for enhancement of understanding of the background of the described technology and therefore it may contain information that does not form the prior art that is already known in this country to a person of ordinary skill in the art.

SUMMARY

Embodiments are directed to including a rechargeable battery, a mount frame wrapping at least part of the rechargeable battery, an outer case wrapped around the mount frame, the outer case including a first case including a first protrusion portion protruding therefrom, and a second case having a second protrusion portion protruding therefrom, the first protrusion portion being fixed to the second protrusion portion, a protective circuit module electrically connected to the rechargeable battery.

The first protrusion portion may include an extension portion protruding from the first case in a first direction, and a fixing unit bent in a second direction crossing the first direction, the fixing unit being fixed to the second protrusion portion.

The mount frame may include a first frame covering opposing sidewall portions of the rechargeable battery, a second frame covering the bottom portion of the rechargeable battery, and a third frame coupled to the first frame and coupled to the protective circuit module.

The third frame may include an inserting hole into which the first protrusion portion is inserted.

The first protrusion portion may include at least two first protrusion portions protruding to the outside of the first case.

The second protrusion portion may include a plurality of second protrusion portions protruding from one side of the second case in a direction of the third frame direction and a plurality of second protrusion portions protruding from another side of the second case in the second frame direction.

At least one first protrusion portion of the plurality of first protrusion portions and a respective second protrusion portion of the plurality of second protrusion portions may be coupled by resistance welding or laser welding in a state in which the first protrusion portion and the second protrusion portion are in contact with each other.

The outer case may be made of at least one of iron (Fe), aluminum (Al) or a stainless steel (SUS).

The first case and the second case may be coupled by resistance welding or laser welding.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
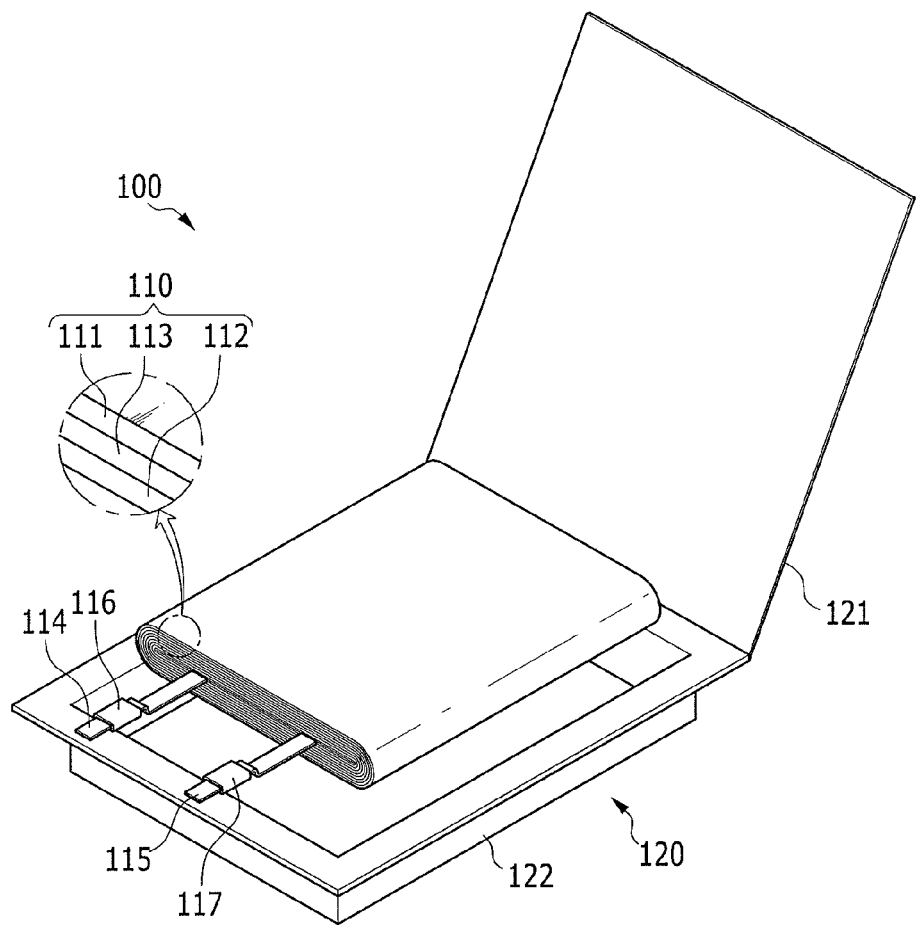
FIG. 1 illustrates a drawing schematically depicting a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a drawing schematically depicting a rechargeable battery according to an exemplary embodiment. As shown in FIG. 1, the rechargeable battery 100 may include an electrode assembly 110 and a pouch 120 accommodating the electrode assembly 110. The electrode assembly 110 may be a structure in which a positive electrode 111, negative electrode 112, and a separator 113 interposed between the positive electrode 111 and the negative electrode 112 are spirally wound.

The separator 113 is located between the positive electrode 111 and the negative electrode 112 to prevent a short and to enable the movement of the lithium ions. The separator 113 may be formed of a polyethylene (PE) or polypropylene membrane, or multi-layers thereof.

The positive electrode 111 may be electrically connected with a positive electrode tab 114. In addition, the negative electrode 112 may be electrically connected with a negative electrode tab 115. The positive electrode tab 114 may be bound with an insulation tape 116 for the positive electrode, and the negative electrode tab 115 may be bound with an insulation tape 117 for the negative electrode.

The pouch 120 may be a case that includes an upper case 121 and a lower case 122. At least one side of the upper case 121 and lower case 122 may be integrally connected. The pouch 120 may have a three-layer structure including a metal foil and an insulating film laminated on both sides of the metal foil, as an example.

Figure 2:
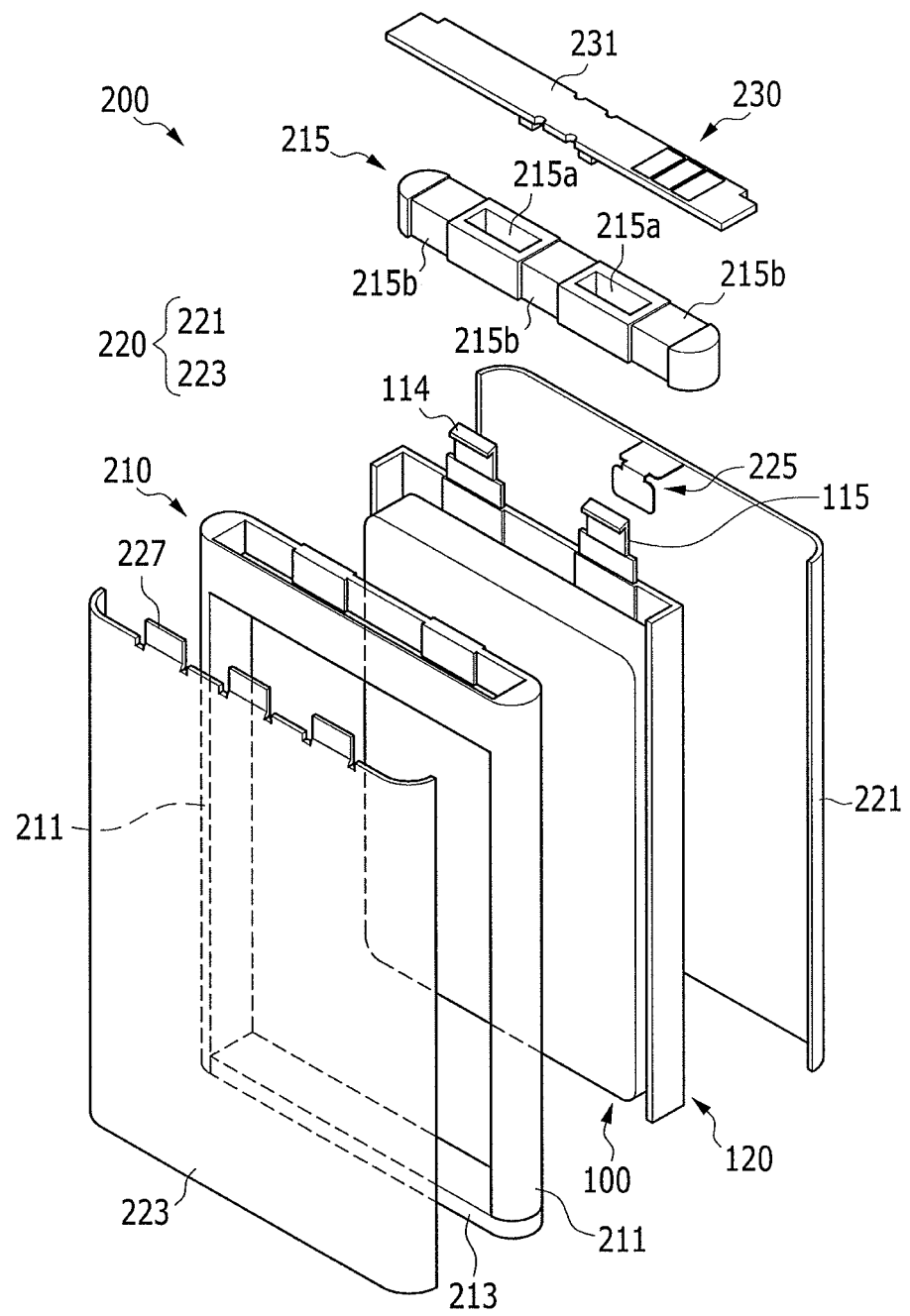
FIG. 2 illustrates a partial exploded perspective view schematically depicting a rechargeable battery according to n exemplary embodiment.

FIG. 2 illustrates a partial exploded perspective view schematically depicting a rechargeable battery according to an exemplary embodiment.

As shown in FIG. 2, the rechargeable battery pack 200 according to this exemplary embodiment may include a rechargeable battery 100, a mount frame 210 wrapping at least part of the rechargeable battery 100, an outer case 220 installed to be wrapped around the mount frame 210 and a protective circuit module 230 electrically connected to the rechargeable battery 100.

The rechargeable battery 100 is provided with the pouch 120 accommodating the electrode assembly 110. From one side of the pouch 120, an end portion of the positive electrode tab 114 and an end portion of the negative electrode tab 115 are exposed to the outside. The pouch 120 may be a case with flexibility such that the pouch may be freely foldable in a state where the electrode assembly 110 is accommodated on the inside of the pouch 120. At least part of the rechargeable battery 100 may be wrapped by the mount frame 210.

The mount frame 210 may include a first frame 211 to cover two sidewall portions of the rechargeable battery 100, a second frame 213 to cover the bottom portion of the rechargeable battery 100, and a third frame 215 into which the protective circuit module 230 is installed. The first frame 211 and the second frame 213 of the mount frame 210 may be integrally formed. The mount frame 210 may be installed to be wrap around at least a portion of the outer surface of the rechargeable battery 100. The mount frame 210 may be formed by injection molding using a polymer resin. In addition, the first frame 211 is installed with the third frame 215.

The third frame 215 may be fixed to an opening of the first frame 211 by a fitting coupling. The third frame 215 may be formed with a through-hole 215a through which a positive tab 114 and a negative electrode tab 115 may be exposed to the direction of the protective circuit module 230 direction. In addition, the third frame 215 may be formed with a plurality of inserting holes 215b. The first protrusion portion 225 and the second protrusion portion 227 of the outer case 220 may be inserted into the inserting hole 215b, as will be described in more detail below.

The protective circuit module 230 may be connected with the electrode assembly 110 to control the operation of the electrode assembly 110 including charging discharging. The protective circuit module may be made of a thin plate in the form of a rectangle elongated along one direction and may include a circuit substrate 231 printed as wiring pattern.

The rechargeable battery 100 may be protected by the outer case 220 including the first case 221 and the second case 223.

The first case 221 may be installed to cover a first side of the rechargeable battery 100 not protected by the mount frame 210. The second case 223 may be installed to cover a second side of the rechargeable battery 100 not protected by the mount frame 210. The first case 221 and the second case 223 may be installed on opposing sides of the rechargeable battery 100 to protect the rechargeable battery 100.

The first case 221 and the second case 223 may be made of at least one of iron (Fe), aluminum (Al) or a stainless steel (SUS). Accordingly, the first case 221 and the second case 223 may be fixed by welding in a state where portions of the edges of the sides is overlap with each other. The first case 221 and the second case 223 may be fixed by resistance welding or laser welding in a state where a portion of and edge of the first case 221 is located to be overlapped with a portion of an edge of the second case 223. In other implementations, the first case 221 and the second case may be coupled using a physical fitting. When the first case 221 and the second case 223 are coupled with the fitting, the sides of the first case 221 and the second case 223 may be formed with a protrusion and depression portion (not shown) to be fixed by the fitting using an elastic force. In addition, the first case 221 and the second case 223 may be coupled to the mount frame 210 using a fitting.

The first case 221 and the second case 223 may be fixed at a location of the third frame 215 by coupling the first protrusion portion 225 and the second protrusion portion 227.

Figure 3:
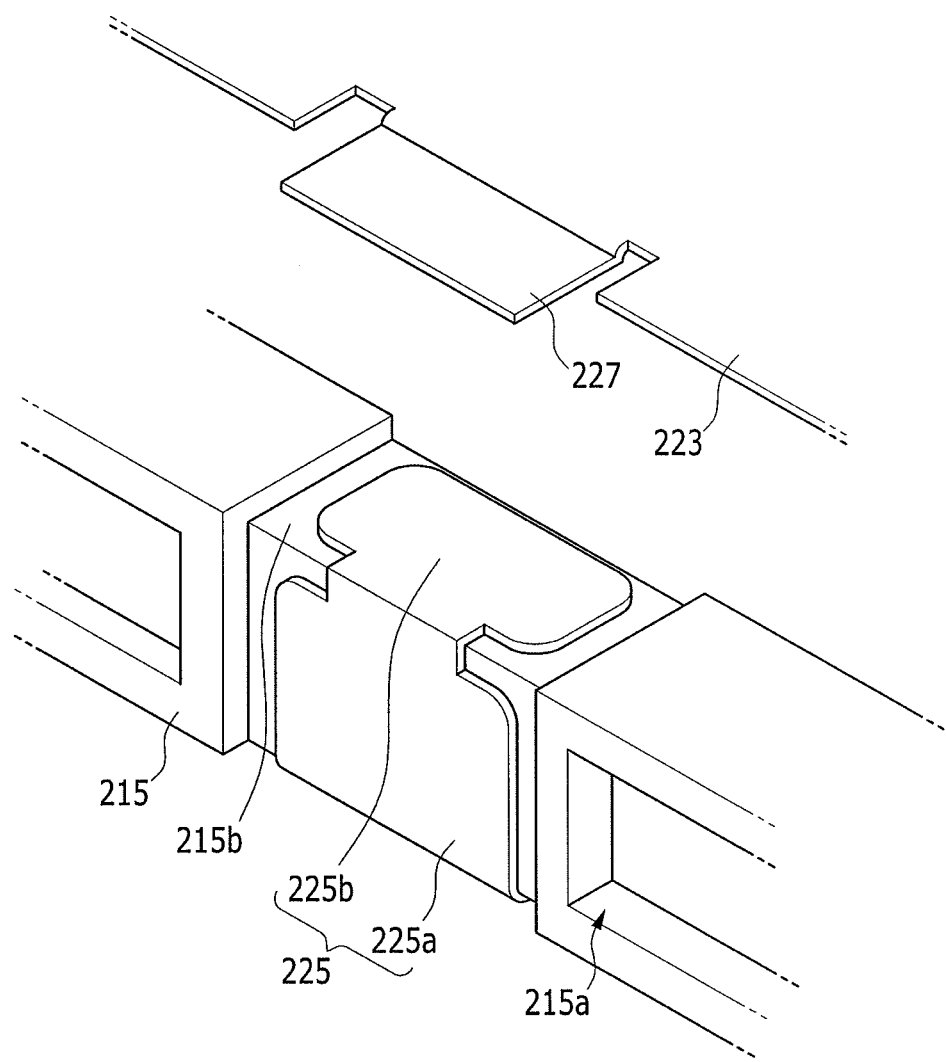
FIG. 3 illustrates a drawing schematically depicting a state where a first protrusion portion protruding from a first case is mounted into an inserting hole of a third frame and a state where a second protrusion portion of the first case protrudes.

FIG. 3 illustrates a drawing schematically showing a state where a first protrusion portion 225 protruding from a first case 221 is mounted into an inserting hole of a third frame and a state where a second protrusion portion 227 of the second case 223 protrudes.

As shown in FIG. 3, the first protrusion portion 225 protrudes from the first case 221. In this exemplary embodiment, even though it is illustrative that one of the first protrusion portions 225 protrudes to the outside of the first case 221, in other implementations, at least two of the first protrusion portions 225 can protrude to the outside of the first case 221.

The first protrusion portion 225 may include an extension portion 225a integrally connected to the first case 221 and protruding in a first direction, and a fixing unit 225b bent in a second direction crossing at the first direction and protruding. Here, the term "first direction" refers to a direction that is perpendicular to the plane of the first case 221, and the term "second direction" refers to a direction that is horizontal to the plane of the first case 221. In other implementations, the first direction and the second direction may be defined by other suitable predetermined angles.

One end of the extension portion 225a may be integrally connected to an edge portion of the first case 221. The extension portion 225a may be made of the same metal material as the first case 221, such as, for example, at least one of iron (Fe), aluminum (Al) or a stainless steel (SUS). The extension portion 225a may extend to be bent in the direction of the second case 223 from the edge of the first case 221.

The fixing unit 225b may be bent in the second direction crossing the direction in which the extension portion 225a protrudes. The fixing unit 225b may be bent in the second direction at the end of the extension portion 225a such that the fixing unit 225b is located in the inserting hole 215b of the third frame 215. In the present exemplary embodiment, the first direction that protrudes from the extension portion 225a and the second direction that protrudes from the fixing unit 225b have the crossing angle of 90-degrees. In other implementations, the angles of the first direction and the second direction may be selected as a predetermined angle corresponding to a shape of the inserting hole 215b of the third frame 215. The second protrusion portion 227 of the second case 223 may be located on the upper side of the fixing unit 225b in a state where one side of the fixing unit 225b is mounted in the inserting hole 215b of the mount frame 210.

Figure 4:
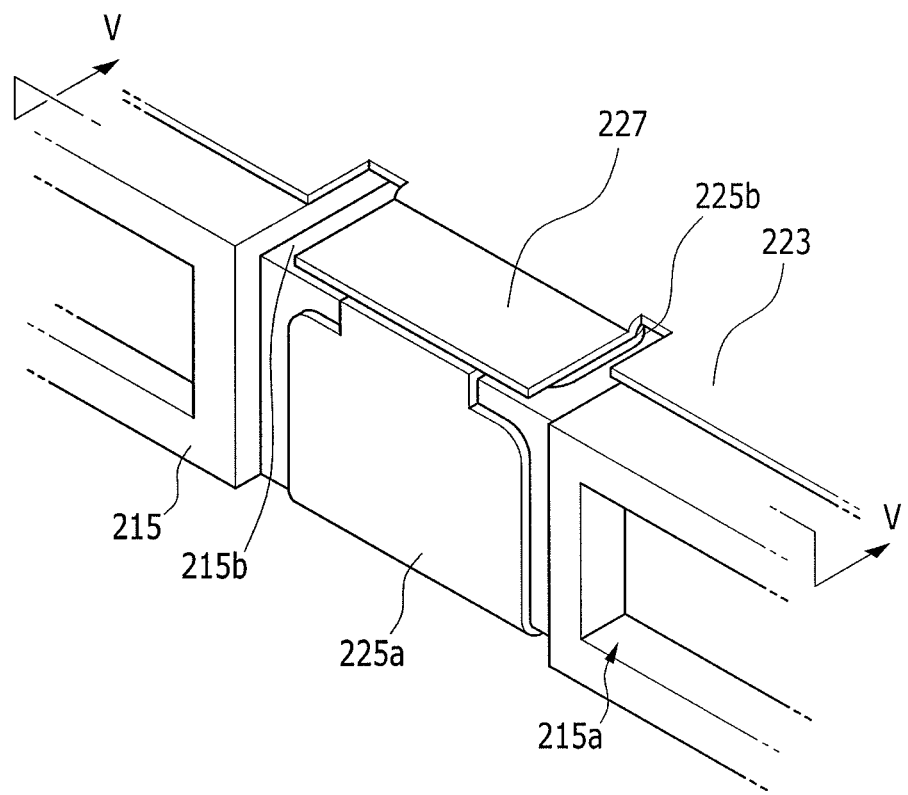
FIG. 4 illustrates a drawing schematically depicting a state where a first protrusion portion of a first case and a second protrusion portion of a second case are in contacted and fixed.
Figure 5:
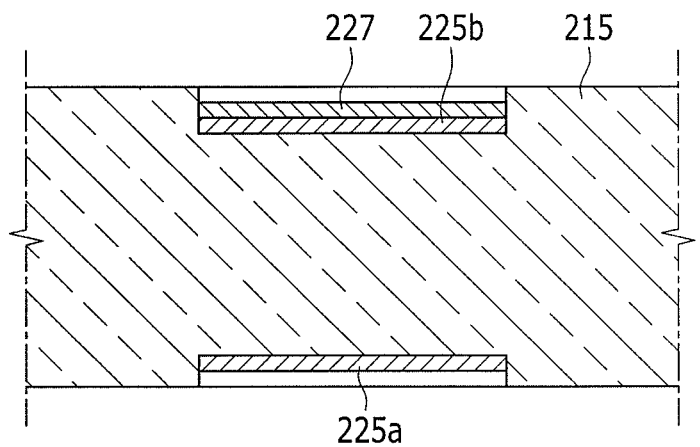
FIG. 5 illustrates a drawing taken along a line V-V of FIG. 4.

FIG. 4 illustrates a drawing schematically depicting a state in which a first protrusion portion of a first case and a second protrusion portion of a second case are in contact and are fixed, and FIG. 5 is a drawing taken along a line V-V of FIG. 4.

As shown in FIGS. 4 and 5, the first protrusion portion 225 of the first case 221 may be mounted in the inserting hole 215b of the third frame 215. In addition, the second protrusion portion 227 of the second case 223 may be located to be in contact with the upper side of the first protrusion portion 225. The first protrusion portion 225 and the second protrusion portion 227 can be fixed by resistance welding or laser welding, or the like in a state where the first protrusion portion 225 of the first case 221 and the second protrusion portion 227 of the second case 223 are in contact. As a result, in a state where the first case 221 and the second case 223 are located on opposing sides of the rechargeable battery 100, the first case 221 and the second case 223 may be coupled by welding such that the case 220 protects and improves the durability of the rechargeable battery 100.

Figure 6:
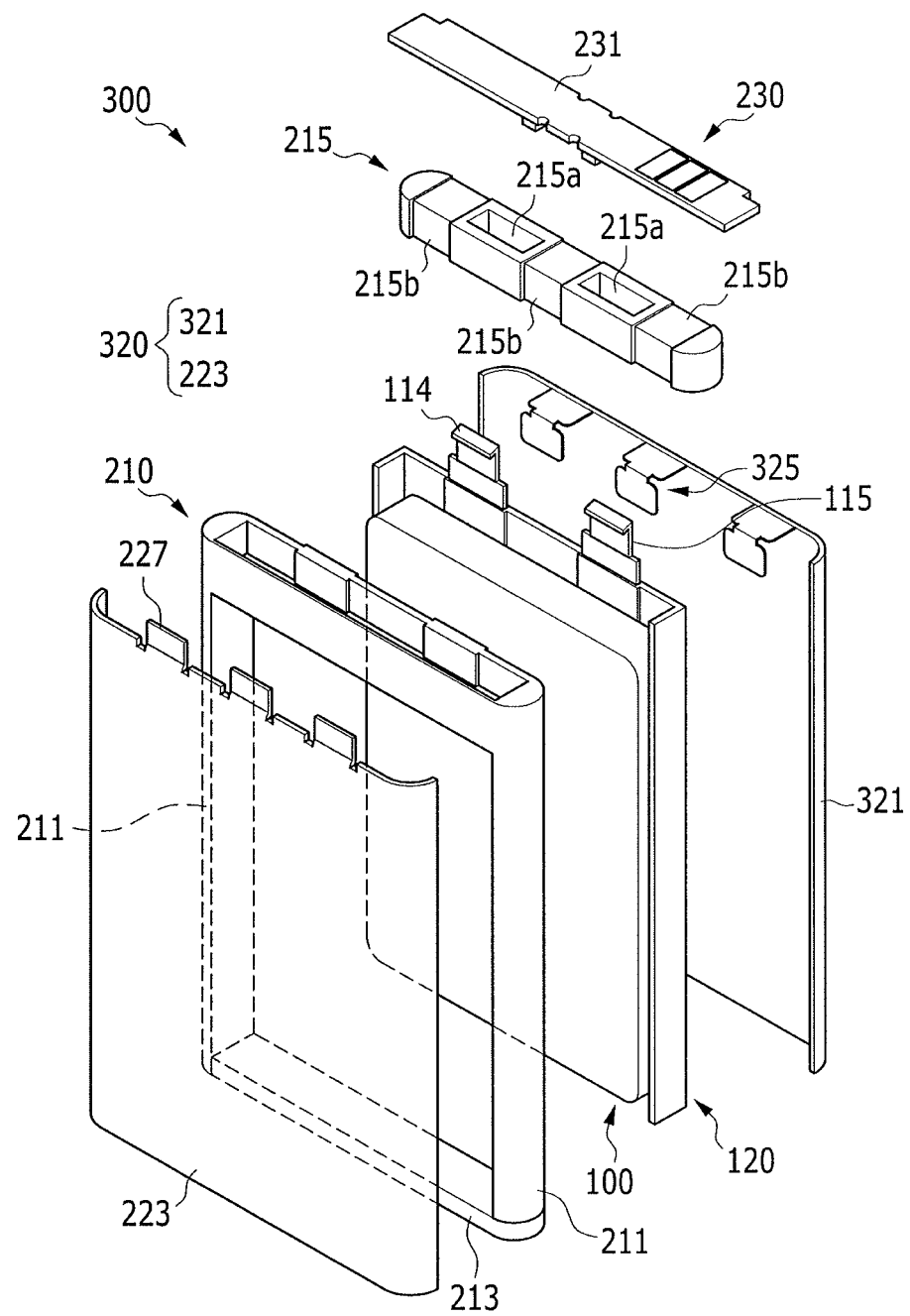
FIG. 6 illustrates a partial exploded perspective view schematically depicting a rechargeable battery according to another exemplary embodiment.

FIG. 6 illustrates a partial exploded perspective view schematically illustrating a rechargeable battery according to another exemplary embodiment. The same reference numbers of FIGS. 1 to 5 refer to the same members having the same functions. Hereinafter, detail description of the same reference numbers will not be repeated.

As shown in FIG. 6, the rechargeable battery pack 300 according to this exemplary embodiment includes the rechargeable battery 100, the protective circuit module 230 electrically connected to the rechargeable battery 100, and the outer case 320 located to be wrapped around the rechargeable battery 100 and including the first case 321 and the second case 223. Here, at least two of the first protrusion portions 325 protrude from the first case 321. The second protrusion portions 227 protrude from the second case 223 and are each fixed to corresponding ones of the first protrusion portions 325.

This exemplary embodiment describes that three of the first protrusion portion 325 protrude from the edge of the first case 321, as an example. Accordingly, three of the second protrusion portion 227 may protrude to the outside from the edge of the second case 223 to correspond to the number of the first protrusion portions 325. The first protrusion portion 325 of the first case 321 and the second protrusion portion 227 of the second case 223 may be coupled by resistance welding or laser welding in a state of being in contact.

As described above, three of the first protrusion portions 325 of the first case 321 and three of the second protrusion portions 227 of second case 223 may be coupled by welding, respectively, and thus, durability of the case of the rechargeable battery pack may be improved.

Figure 7:
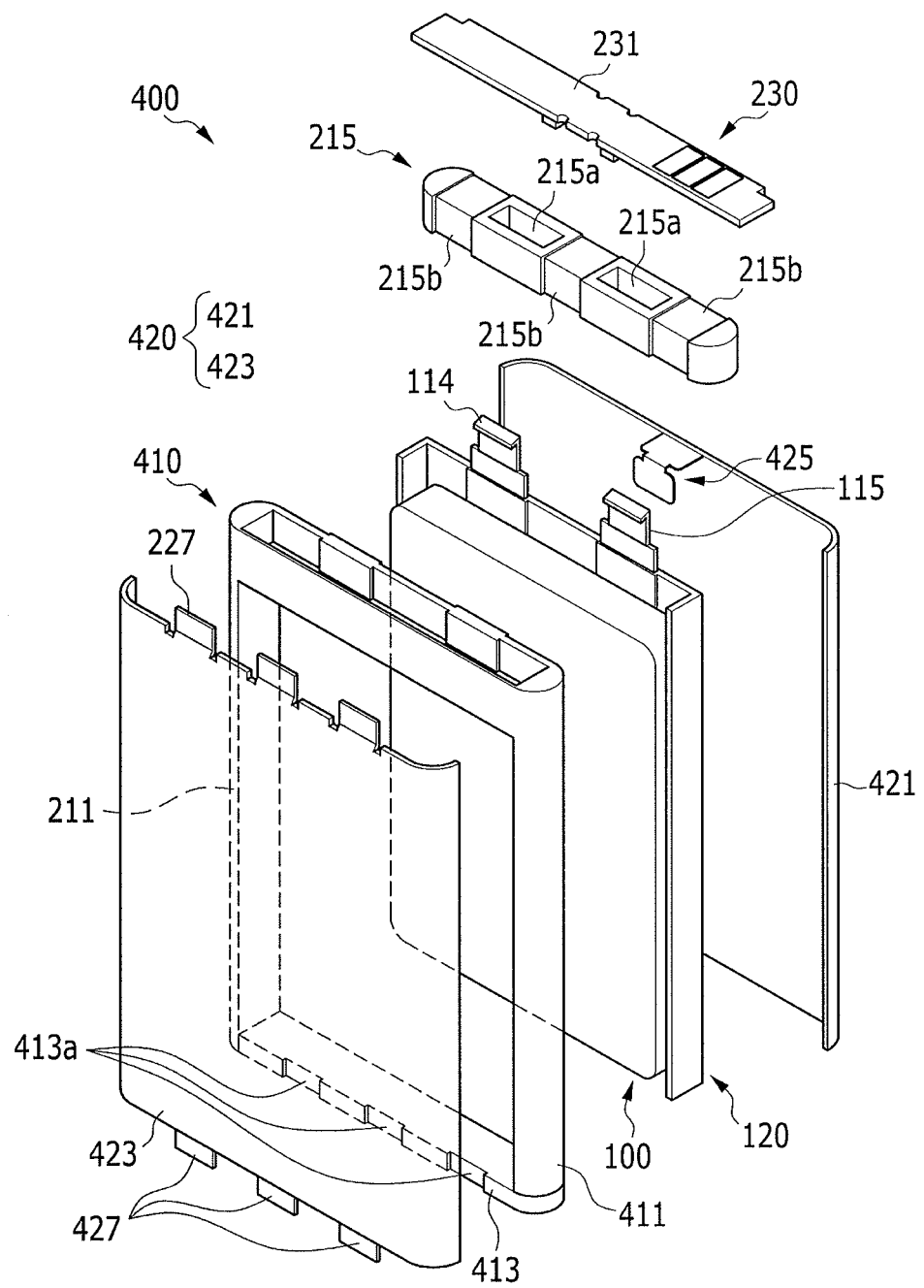
FIG. 7 illustrates a partial exploded perspective view schematically depicting a rechargeable battery according to another exemplary embodiment.
Figure 8:
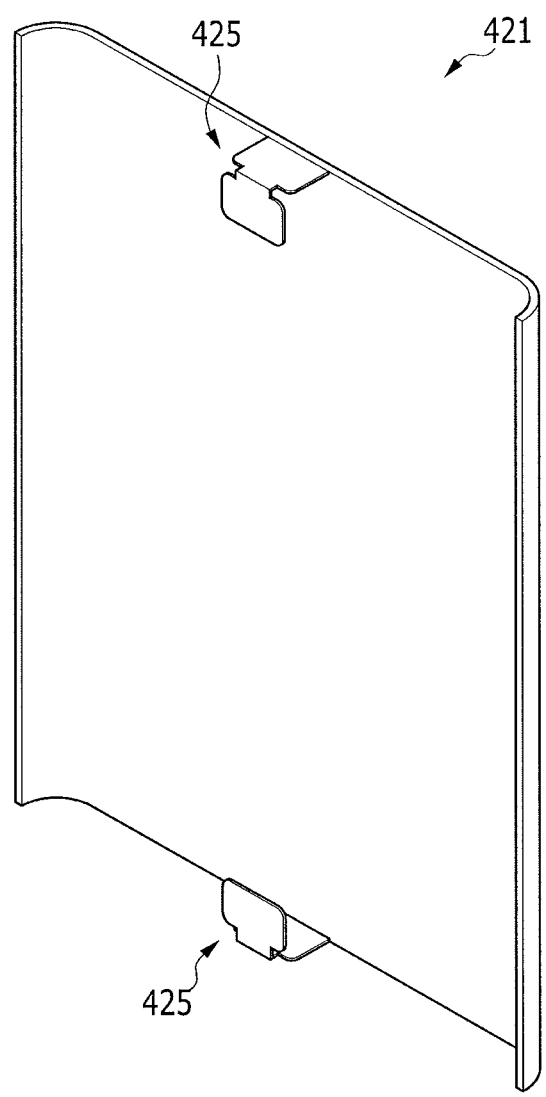
FIG. 8 illustrates a perspective view schematically depicting the first case of FIG. 7.

FIG. 7 illustrates a partial exploded perspective view schematically depicting a rechargeable battery 400 according to another exemplary embodiment and FIG. 8 illustrates a perspective view schematically depicting the first case 421 illustrated in FIG. 7. The same reference numbers of FIGS. 7 to 8 refer to the same members having the same functions. Hereinafter, detail description of the same reference numbers will not be repeated.

As shown in FIGS. 7 and 8, the rechargeable battery pack 400 according to this exemplary embodiment includes the rechargeable battery 100, the mount frame 210 wrapping at least one portion of the rechargeable battery 100, the protective circuit module 230 electrically connected to the rechargeable battery 100, and the outer case 420 wrapped around the rechargeable battery 100. The outer case 420 includes the first case 221 and the second case 223.

The one of the first protrusions 425 may protrude from the top of the first case and another of the first protrusions may protrude from the bottom of the first case 421. One first protrusion 425 may protrude from the top side of the first case 421 in a direction of the third frame 413 direction and another first protrusion 425 may protrude from the bottom side of the first case 421 in a direction of the second frame 413.

The first protrusion 425 may be formed to be the same shape and size at the top and bottom of the first case 421. Since the first protrusion 425 of this exemplary embodiment is the same as that of the first embodiment, the detail description will not be repeated.

The mount frame 410 includes the first frame 411 to cover two sidewall portions of the rechargeable battery 100, the second frame 413 to cover the bottom portion of the rechargeable battery 100, and the third frame 215 on which the protective circuit module 215 is installed.

The second frame 413 may be formed with a coupling hole 413a for fixing in a state where the first protrusion portion 425 of the first case 421 and the second protrusion portion 427 of the second case 423 are inserted. Thus, the first case 421 and the second case 423 can install more stable while improving durability by fixing The first protrusion portion 425 and the second protrusion portion 427 at the locations of the third frame 415 and the second frame 413 may be fixed by welding. Accordingly, stability and durability of the first case 421 and the second case 423 may be improved.

By way of summation and review, a rechargeable battery may be provided with a protective circuit module to control charging and discharging. The protective circuit module may prevent over-charge and/or over-discharge of the rechargeable battery and may serve to improve the safety and cycle-life of the rechargeable battery.

In such a rechargeable battery, the electrode assembly and the protective circuit module may include a case to wrap the outside of the electrode assembly, as a way to protect the rechargeable battery from external impact or the like. In this case, if the case is physically coupled into the outside of the electrode assembly only by a fitting, there is risk that the durability may be deteriorated due to deformation of the fixed part in the event of external impact to the case.

Embodiments provide a rechargeable battery pack having a case that may provide improved durability. A case to protect the rechargeable battery may include a first case and a second case that are welding-coupled to each other in a state where the first case and the second case are wrapped around the rechargeable battery. Thereby the durability of the rechargeable battery pack may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A rechargeable battery pack, comprising:
   a rechargeable battery;
   a mount frame wrapping at least part of the rechargeable battery;
   an outer case wrapped around the mount frame, the outer case including a first case including a first protrusion portion protruding therefrom, and a second case having a second protrusion portion protruding therefrom, the first protrusion portion being fixed to the second protrusion portion; and
   a protective circuit module electrically connected to the rechargeable battery,
   wherein the first protrusion portion includes:
   an extension portion protruding from the first case in a first direction, and
   a fixing unit bent in a second direction crossing the first direction, the fixing unit being fixed to the second protrusion portion.

2. The rechargeable battery pack as claimed in claim 1, wherein the mount frame includes:
   a first frame covering opposing sidewall portions of the rechargeable battery;
   a second frame covering a bottom portion of the rechargeable battery; and
   a third frame coupled to the first frame and coupled to the protective circuit module.

3. The rechargeable battery pack as claimed in claim 2, wherein the third frame includes an inserting hole into which the first protrusion portion is inserted.

4. The rechargeable battery pack as claimed in claim 3, wherein the first protrusion portion includes at least two first protrusion portions protruding to the outside of the first case.

5. The rechargeable battery pack as claimed in claim 4, wherein the second protrusion portion includes a plurality of second protrusion portions protruding from one side of the second case in a direction of the third frame direction and a plurality of second protrusion portions protruding from another side of the second case in the second frame direction.

6. The rechargeable battery pack as claimed in claim 5, wherein at least one first protrusion portion of the plurality of first protrusion portions and a respective second protrusion portion of the plurality of second protrusion portions are coupled by resistance welding or laser welding in a state in which the first protrusion portion and the second protrusion portion are in contact with each other.

7. The rechargeable battery pack as claimed in claim 1, wherein the outer case is made of at least one of iron (Fe), aluminum (Al) or a stainless steel (SUS).

8. The rechargeable battery pack as claimed in claim 1, wherein the first case and the second case are coupled by resistance welding or laser welding.

* * * * *